Figure 1:
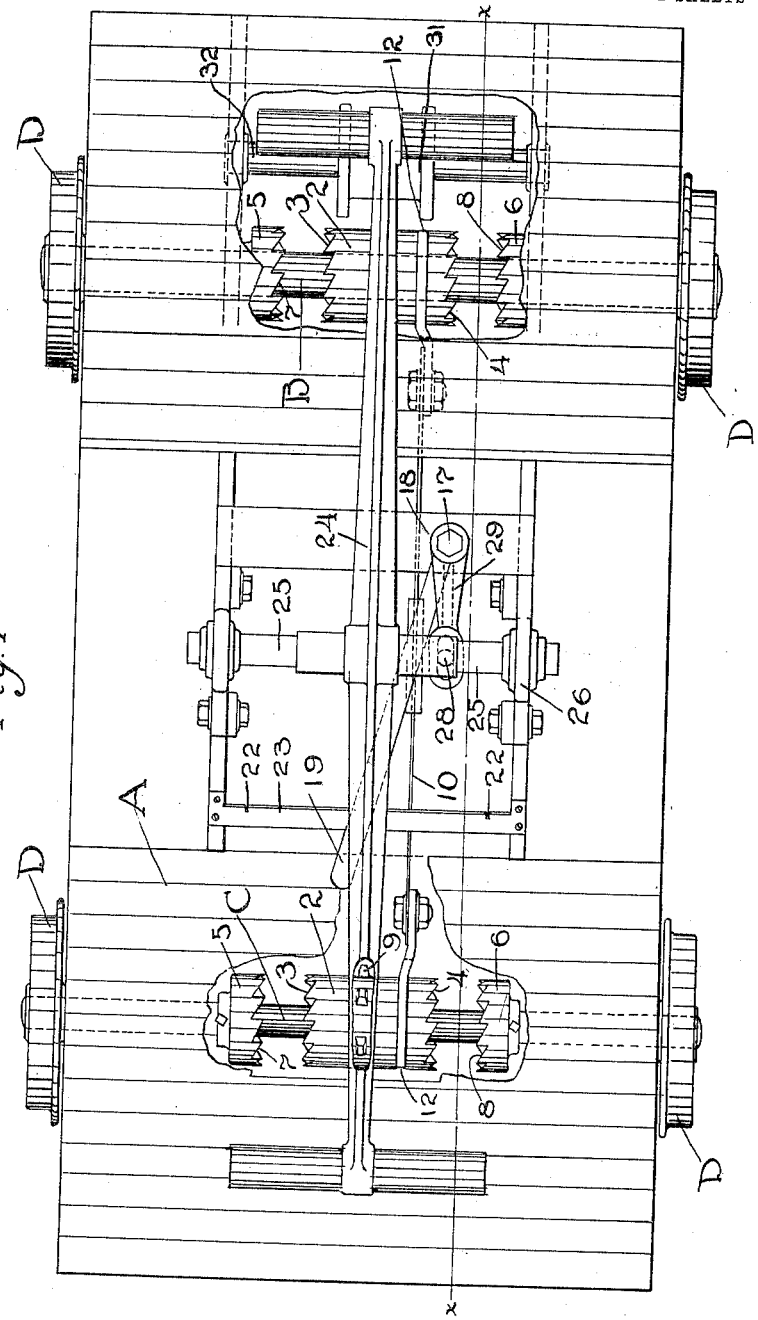

J. M. TAFT.
HAND CAR.
APPLICATION FILED JULY 21, 1913.

1,076,717.

Patented Oct. 28, 1913.
2 SHEETS—SHEET 1.

WITNESSES

INVENTOR
James M. Taft
By Lothrop & Johnson
his Attorneys.

J. M. TAFT.
HAND CAR.
APPLICATION FILED JULY 21, 1913.
1,076,717.
Patented Oct. 28, 1913.
2 SHEETS—SHEET 2.
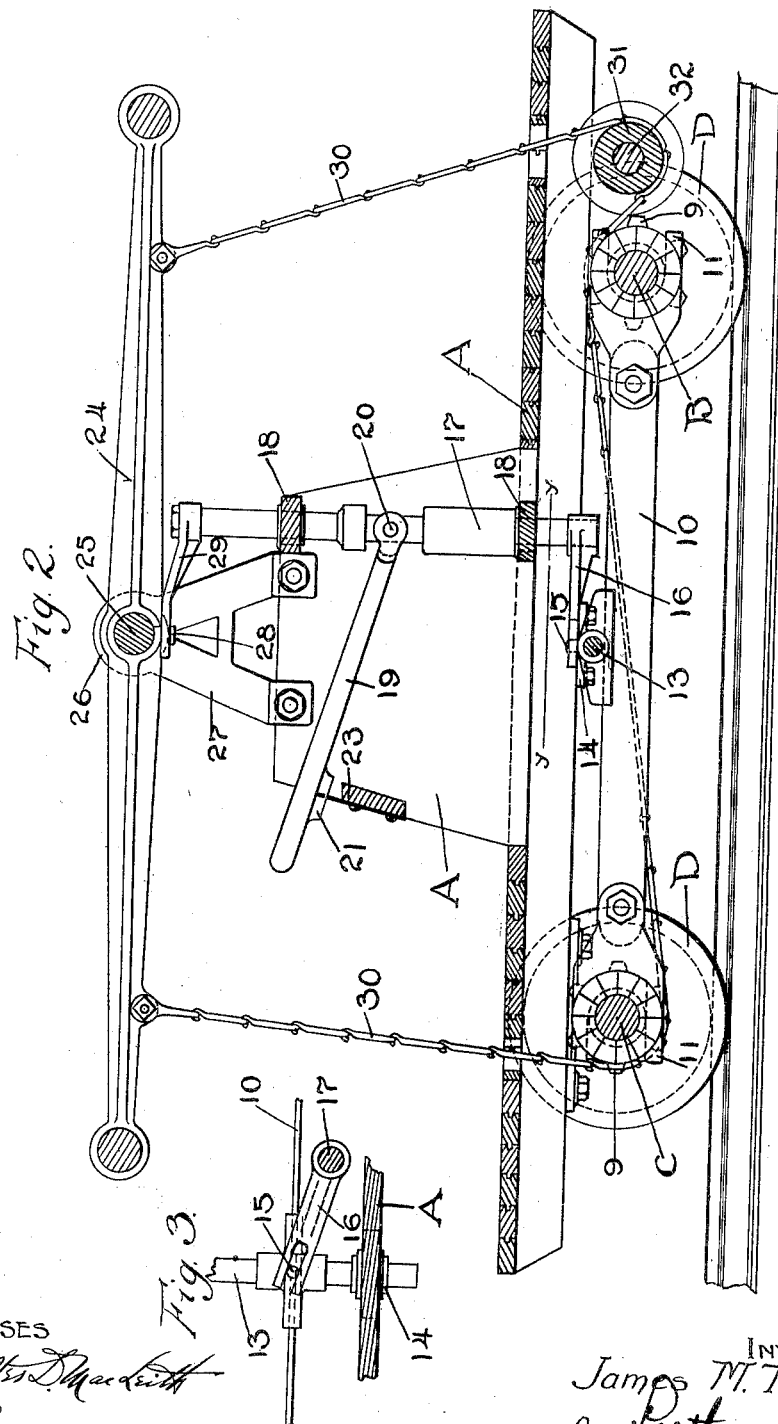

UNITED STATES PATENT OFFICE.

JAMES M. TAFT, OF HALFWAY, MISSOURI.

HAND-CAR.

1,076,717.  Specification of Letters Patent.  Patented Oct. 28, 1913.

Application filed July 21, 1913. Serial No. 780,208.

*To all whom it may concern:*

Be it known that I, JAMES M. TAFT, a citizen of the United States, residing at Halfway, in the county of Polk and State of Missouri, have invented certain new and useful Improvements in Hand-Cars, of which the following is a specification.

The invention relates to improvements in hand cars, its objects being, among other things, to provide improved propelling mechanism, whereby the power can be applied continuously to the two axles of the car, acting upon one axle as it leaves the other axle, and whereby, when the driving power ceases to be applied and the car is allowed to run or "coast," the propelling mechanism and handles will not be worked by turning of the axles but will remain at rest.

Further objects are to provide simple and easily operated means for reversing the direction of movement of the car and generally to provide propelling mechanism which shall be simple, efficient and responsive.

To these ends the invention consists in the construction, combination, and arrangement of parts hereinafter described and claimed.

In the accompanying drawings illustrating the preferred embodiment of the invention, Figure 1 is a plan view of the car with some parts broken away; Fig. 2 is a longitudinal section on line $x$—$x$ of Fig. 1; and Fig. 3 is a detail of the shifting bar connections in section on line $y$—$y$ of Fig. 2.

In the drawings is shown a hand car of ordinary construction having a framework A, upon the underside of which are journaled front and rear axles B and C, respectively. Each axle carries a pair of wheels D, which run upon the track. Centrally sleeved upon each axle, so as to be capable of longitudinal as well as rotary movement thereon, is a sliding clutch member 2 having at one end a ratchet face 3, and at the other end a ratchet face 4, the teeth of which are inclined in opposite directions, but in the same direction as the corresponding face of the sliding clutch member upon the other axle. Fast upon the axle on each side of the sliding clutch member 2, and spaced apart therefrom a sufficient distance to be out of engagement therewith when the clutch member 2 is centrally disposed, are a pair of coacting fixed clutch members 5 and 6 having ratchet faces 7 and 8, respectively, the teeth of which are opposed to the teeth of the adjacent face of the sliding clutch member 2.

Each sliding clutch member is provided circumferentially with sprocket teeth 9 which aline with the teeth of the other sliding clutch member when these members stand in alinement. These clutch members are connected by means of a spring shifting bar 10, which has at each end jaws 11 which stand within an annular groove 12 in the sliding clutch member. The shifting bar is centrally secured to a cross rod 13, which has sliding support in bearings 14 on the underside of the framework and has at the top slot and pin connection 15 with a crank 16 upon the upright shaft 17. This shaft is journaled in vertical bearings 18 carried by the framework and can be turned by means of a shifting lever or handle 19 so as to swing the crank arm 16 from right to left or left to right. The throw lever 19 is connected with the shaft 17 by means of a horizontal pivot 20, so that its outer end can be lifted, and is provided on its underside with a fin or key 21, which, when dropped into one of the notches 22 in the cross bar 23, will lock the shifting bar and sliding clutch member in adjusted positions.

The car is propelled by means of an oscillatory lever or walking beam 24, which at its central point is fast to a cross shaft 25. This cross shaft has rotative as well as longitudinally sliding support in bearings 26 carried by the upwardly extending brackets 27. The cross shaft also has slot and pin connection 28 with a crank arm 29 carried by the vertical shaft 17, so that when the shifting lever 19 is turned, the walking beam will be shifted in unison with the sliding clutch members. Pivotally connected with the two ends of the walking beam is a sprocket chain 30 which passes down under the sprocket upon the rear sliding clutch member 2 and thence up over the sprocket on the forward sliding clutch member 2, whence it passes down under an idler pulley 31, sleeved upon a cross pin or rod 32 secured to the frame and standing parallel with the axles. Thus, when the walking beam is oscillated or worked up and down, the sprocket chain, running under one of the clutch sprockets and over the other, will drive the clutch members 2 in opposite directions, and these directions will be reversed at each single oscillation of the walking beam,—that is at each change from an upward to a downward stroke or vice versa.

The operation of the machine is as follows: When the machine is at rest the parts will stand normally in the position shown in Fig. 1, with the sliding clutch members centrally disposed between the coacting fixed clutch members on either side, and out of engagement therewith. To drive the car, the vertical shaft 17 is turned by means of the handle 19 so that the cranks 16 and 29 carried by that shaft and acting respectively upon the sliding cross rod 13 for the shifting bar 10 and the sliding cross shaft 25 for the walking beam, will move the shifting bar and walking beam in unison to one side of the car, and thereby shift the sliding clutch members into engagement with the fixed clutch members at that side. If the car is to be driven ahead the sliding clutch members will be moved so as to throw their ratchet faces 4 into engagement with the opposed ratchet faces 8 upon the fixed clutch members 6; while if the car is to be driven backward the sliding clutch members will be moved in the opposite direction so as to bring their ratchet faces 3 into engagement with the opposed ratchet faces 7 of the fixed clutch member 5. As the walking beam is shifted in unison with the sliding clutch members, the chain 30 will always stand in alinement with the sprockets 9 and run freely over them, the chain, as it is shifted, of course carrying with it the idler pulley 31. At the extreme movement of the throw lever 19 to the right or left there is a notch 22 in the cross bar 23 adapted to receive the fin 21 of the throw lever, so that, when this lever is allowed to drop, its fin will enter the notch and thus hold the sliding clutch members in locked engagement with the coacting fixed clutch members. Assuming that the car is to be driven ahead, the ratchet faces 4 of the sliding clutch members will be held in engagement with the ratchet faces 8 of the fixed clutch members. If now the rear end of the walking beam is thrust down the chain, running over the sprocket 9 of the sliding clutch member upon the forward axle, will turn this clutch member and its coacting fixed clutch member forwardly and thereby drive the front axle and car in a forward direction. At the same time the chain, running under the sprocket 9 of the sliding clutch member upon the rear axle, will turn this clutch member rearwardly, or in a reverse direction, its teeth riding over the teeth of the coacting fixed clutch member. This is made possible by the fact that the shifting bar 10 is made of spring metal, so that it will yield sufficiently to allow the ratchet teeth upon the clutch members to pass each other when the sliding clutch is not driven forwardly. Then when the opposite end of the walking beam is thrust down the direction of motion of the chain and clutch members will be reversed, so that the rear clutch members and axle will be driven forwardly while the forward clutch members will pass each other and allow the front axle and wheels to act as idlers. That is, the power will be applied alternately first to one axle and then to the other, leaving one axle as it takes up the other, thus keeping up a constant application of power to one or the other of the two axles. To reverse the movement of the car it is only necessary to move the throw lever 19 from one of the notches 22 to the other, and thereby shift the sliding clutch members 2 into engagement with the fixed members 5 on the other side, the ratchet teeth on the clutch member 5 and the coacting face of the sliding clutch 2 being directed oppositely to the teeth upon the fixed clutch 6 and the adjacent face of the sliding clutch, so that the direction of motion of the axles will be reversed, and the car will be driven backward.

An important feature of the invention is that when the operators stop pumping the walking beam, and allow the car to coast or run voluntarily under its momentum, the walking beam will not be driven by the turning of the axles but will stop of itself, for, as the corresponding faces of the front and rear clutch members have their ratchet teeth inclined in the same direction, the teeth on the fixed clutch members will simply ride over the teeth upon the sliding clutch member without causing it to be turned. Of course when the throw lever is in middle position the clutches will not be in engagement and the car can be moved either way by hand.

I claim as my invention:

1. In a hand car, the combination with front and rear axles, of a sliding clutch member centrally sleeved upon each axle and having at its ends ratchet faces with oppositely inclined teeth, coacting fixed clutch members fast upon the axle on each side of the sliding clutch members and spaced apart therefrom, said fixed clutch members having teeth opposed to the teeth of the adjacent faces of the sliding clutch members, and the teeth of all of the clutch faces upon one axle being inclined in the same direction as the teeth of the corresponding clutch faces upon the other axle, a spring shifting bar engaging both of the sliding clutch members whereby to throw and hold them in spring pressed engagement with the fixed clutch members on one or the other side thereof, and means for reciprocatingly driving said sliding clutch members in opposite directions, whereby the driving power is applied to one axle as it leaves the other axle.

2. In a hand car, the combination with front and rear axles, of a pair of spaced fixed clutch members and an intermediate sliding clutch member upon each axle, the opposing clutch faces upon each axle having ratchet teeth inclined in opposite directions, but in the same direction as the teeth of the corresponding clutch faces upon the other axle, alining sprockets upon the sliding clutch members, an idler pulley having rotative and longitudinally sliding support on the outside of one of said sliding clutch members, a walking beam, a sprocket chain having its ends connected with opposite ends of the walking beam and running intermediately under the idler pulley and over the sprocket upon the adjacent sliding clutch member, and thence under the sprocket upon the other clutch member, and means for shifting the sliding clutch members and walking beam in unison whereby to throw the sliding clutch members into engagement with the fixed clutch members at one side thereof and at the same time keep the sprocket chain in alinement with said sprockets.

3. In a hand car, the combination with front and rear axles, of a pair of spaced fixed clutch members and an intermediate sliding clutch member upon each axle, the opposing clutch faces upon each axle having ratchet teeth inclined in opposite directions, but in the same direction as the teeth of the corresponding clutch faces upon the other axle, alining sprockets upon the sliding clutch members, an idler pulley having rotative and longitudinally sliding support at the outside of one of said sliding clutch members, a walking beam having oscillatory and transversely sliding support in the frame of the car, a sprocket chain having its ends connected with the opposite ends of the walking beam and running intermediately first under the idler pulley and over the sprocket upon the adjacent sliding clutch member, and thence under the sprocket upon the other clutch member, a transversely movable, resilient shifting bar engaging both of said sliding clutch members, and means operatively connecting said shifting bar and walking beam, whereby the same may be shifted in unison so as to throw the sliding clutch members into spring pressed engagement with the fixed clutch members at one side and to keep the sprocket chain in alinement with said sprockets.

4. In a hand car, the combination with front and rear axles, of a sliding clutch member centrally sleeved upon each axle and provided with circumferential sprocket teeth, said clutch member having at its ends ratchet faces with oppositely inclined teeth, coacting fixed clutch members fast upon the axle on each side of the sliding clutch members and spaced apart therefrom, said fixed clutch members having teeth opposed to the teeth of the adjacent faces of the sliding clutch members and the teeth of all of the clutch faces upon one axle being inclined in the same direction as the teeth of the corresponding clutch faces upon the other axle, an idler pulley having rotative and longitudinally sliding support at the outside of one of said sliding clutch members, a walking beam having oscillatory and transversely sliding support in the frame of the car, a sprocket chain having its ends connected with opposite ends of the walking beam and running intermediately first under the idler pulley and over the sprocket teeth on the adjacent sliding clutch member, and thence under the sprocket teeth on the other clutch member, a spring shifting bar engaging both of said sliding clutch members whereby to throw and hold them in spring pressed engagement with the fixed clutch members on one or the other side thereof, a vertical shaft operatively connected with said shifting bar and walking beam, and means for turning said shaft, whereby to shift said shifting bar and walking beam in unison.

5. In a hand car, the combination with front and rear axles, of a sliding clutch member centrally sleeved upon each axle and having at its ends ratchet faces with oppositely inclined teeth, coacting fixed clutch members fast upon the axle on each side of the sliding clutch members and spaced apart therefrom, said fixed clutch members having teeth opposed to the teeth of the adjacent faces of the sliding clutch members, and the teeth of all of the clutch faces upon one axle being inclined in the same direction as the teeth of the corresponding clutch faces upon the other axle, a centrally supported spring shifting bar engaging both of the sliding clutch members whereby to throw and hold them in spring pressed engagement with the fixed clutch members on one or the other side thereof, a driving connection engaging the upper side of one of said sliding clutch members and the underside of the other sliding clutch member, whereby to drive said sliding clutch members in unison in opposite directions, and means for reciprocating said driving connection.

In testimony whereof I affix my signature in presence of two witnesses.

JAMES M. TAFT.

Witnesses:
HUGH MATHENY,
WELLS TAFT.